United States Patent Office 3,013,954
Patented Dec. 19, 1961

3,013,954
SEPARATION OF ORGANIC MIXTURES
André Pacoud and Jacques Dallemagne, St.-Fons, and Albert Mercier, Lyon, France, assignors to Societe des Usines Chimiques Rhone-Poulenc, Paris, France, a French body corporate
No Drawing. Filed July 1, 1955, Ser. No. 519,621
Claims priority, application France July 9, 1954
2 Claims. (Cl. 202—42)

The present invention is for improvements in or relating to the separation of organic mixtures and more particularly concerns a process for the separation of the components of mixtures of one or more aliphatic monocarboxylic acids with water and formaldehyde, which mixtures may also contain ketones of lower boiling point than the acid or acids.

The invention is especially directed to the separation of the components of mixtures of formic acid, acetic acid, water and formaldehyde, which may in addition contain acetone; such materials being for example as obtained by the catalytic oxidation of acetone by means of molecular oxygen. The separation from one another, even in only a technical state of purity, of the components of such mixtures cannot be carried out without employing complicated means involving a considerable expenditure of heat.

It is the principal object of the present invention to produce from mixtures as aforesaid, in a simple manner and without a considerable expenditure of heat, (a) anhydrous acid or acids substantially free from formaldehyde and ketone (when present), (b) an aqueous formaldehyde solution substantially free from acid, and (c) ketone (when present) substantially free from formaldehyde and acid. It is a further object of this invention, in the case of mixtures resulting from the catalytic oxidation of acetone, to provide a process for the recovery of the anhydrous acids free from formaldehyde and acetone (thus facilitating the subsequent separating of the individual acids), an aqueous solution of formaldehyde free from acidity, and finally acetone containing only traces of formaldehyde.

The present invention broadly comprises a process for the separation of useful products from a mixture of one or more aliphatic monocarboxylic acids, water and formaldehyde, wherein the said mixture is subjected to rectification in the presence of an auxiliary substance which is substantially insoluble in water and which forms with water, but not with said acid or acids, an azeotropic mixture having a boiling point lower than that of the said acid or acids and there are separately recovered the substantially anhydrous acid or acids and the formaldehyde in the form of a substantially acid-free aqueous solution.

The term "auxiliary substance" is used herein to mean a substance which has the properties just recited therefor. Examples of auxiliary substances are such ethers as di-isopropyl ether and di-butyl ether, such esters as isopropyl and butyl formates and acetates and such ketones as methyl isopropyl ketone and methyl isobutyl ketone.

When rectification is effected in the manner hereinbefore described, a ternary azeotropic mixture (auxiliary substance-formaldehyde-water) forms utilising the water in the system and distills off, leaving practically anhydrous acid or acids in the still. The condensation of the compounds of the azeotropic mixture gives a distillate which on standing separates into two layers, the lower aqueous layer containing the formaldehyde and but a minor proportion of auxiliary substance and the upper layer consisting almost wholly of auxiliary substance.

If there is not sufficient water in the initial mixture to obtain the formaldehyde in the desired concentration, the additional quantity of water required may be introduced either into the feed mixture or at any suitably chosen point of the distillation column.

The process of the invention may be applied to the separation of aqueous mixtures which contain, in addition to the acid(s) and formaldehyde, a ketone having a boiling point lower than that or those of the acid or acids present. Such a ketone is acetone. When the process is so applied, the choice of auxiliary substance to be employed is more restricted, since it must not only possess the characteristics hereinbefore referred to but must also be incapable of forming either a binary azeotrope with the ketone or a ternary azeotrope with the ketone and the water present and the boiling point of the azeotropic mixture which it does form must be between that of the ketone and that of the acid or (where more than one acid is present) of the acid of lower or lowest boiling point. This restricted group of auxiliary substances is hereinafter referred to as "ketone auxiliary substances." Examples of ketone auxiliary substances are isopropyl formate and isopropyl acetate. Using a ketone auxiliary substance, it is possible to obtain the ketone free from formaldehyde by introducing at a suitably chosen point in the rectifying column, situated in the lower part of the ketone concentration zone, a quantity of water sufficient to displace the formaldehyde towards the plates situated below this zone. The water thus introduced may be that which (as already mentioned) it may be necessary to introduce in order to obtain the formaldehyde solution in the desired concentration.

It was already known to dehydrate an aliphatic carboxylic acid or a mixture of a number of aliphatic carboxylic acids by means of azeotropic processes, but it was not obvious that such processes would be applicable to complex aqueous mixtures of the said acids with formaldehyde and to such mixtures as also contain ketones, and the fact that all the formaldehyde is collected in the aqueous phase of the azeotropic distillate is a novel and unexpected effect.

The process of the present invention is preferably effected in an apparatus arranged for continuous operation, such apparatus comprising a rectifying still having a vertical column provided with a spaced series of baffle plates of perforated plate, "bubble-cap" or other conventional form, a feed mixture inlet situated at about midway of the column, an acid collecting chamber at the bottom of the column fitted with appropriate heating means and a vapour outlet at the top of the column. The vapour outlet is connected to a condenser feeding condensate to the mid-section of a decanter tank, fitted with two outlet conduits, one at the top, which is connected to the top of the rectifying column, for draw-off and return to the column of auxiliary substance and the other at the bottom for draw-off of formaldehyde solution. When a ketone is present in the feed mixture, it collects in the decanting tank and is removed with the formaldehyde. It is however, possible to remove substantially pure ketone by equipping the column for fractional distillation such that the ketone vapour is withdrawn from the top of the column and the less volatile azeotropic mixture vapour is withdrawn at a point intermediate the feed mixture inlet and the ketone vapour outlet. To achieve substantially complete separation of ketone and formaldehyde under these conditions, it is preferred, if necessary, to adjust the quantity of water in the system so that it takes up all of the formaldehyde present. Any water required for this purpose is introduced at a point above the azeotrope condensation zone.

It is usually convenient to introduce the auxiliary substance into the system separately from the feed mixture to be separated but it can be added to the feed mixture before-hand if desired.

The invention is illustrated by the following examples; the percentages are by weight.

*Example I*

A mixture containing:

90.4% of acetic acid
4.5% of formic acid
1.0% of formaldehyde
4.1% of water is introduced into a column provided at the top with a condenser and a decanting system.

Into the column there is introduced isopropyl ether intended to serve as auxiliary substance. A heterogeneous aqueous phase is condensed at the top and decants. The aqueous mixture contains 23.2% of formaldehyde, 0.3% of auxiliary substance and 0.01% of acids; the organic phase is returned into the column. At the bottom of the column, a mixture of formic acid and acetic acid containing only 0.03% of formaldehyde and 0.05% of water is withdrawn. The acids of this mixture can be separated from one another by known means.

*Example II*

Into a column provided with a decanting plate at a point midway of its height is introduced a mixture composed of:

55.4% of acetic acid
13.5% of formic acid
18% of acetone
6.7% of formaldehyde
6.4% of water The column is charged with isopropyl acetate, as ketone auxiliary substance. The mixture is introduced at the centre of the lower part of the column at the rate of 7 kg. per hour. 2 litres of water per hour are introduced at the middle of the upper part.

1.150 kg. of acetone containing neither auxiliary substance nor acids, and only 0.2% of formaldehyde and 0.2% of water are withdrawn per hour at the top of the column.

On the decanting plate, there are separated the auxiliary substance which returns into the column, and an aqueous layer containing 15% of formaldehyde, 3% of acetone, 2% of auxiliary substance and at most 0.05% of acids. From this mixture a pure formaldehyde solution can readily be obtained.

At the bottom of the column, 4.91 kg. per hour of the mixture of formic acid and acetic acid containing only 0.1% of water and 0.05% of formaldehyde are withdrawn, from which mixture the pure formic acid and the pure acetic acid can be separated without difficulty.

We claim:
1. A process for the separation of the acid substances and formaldehyde from a mixture of at least one lower aliphatic monocarboxylic acid, formaldehyde and water, which comprises subjecting said mixture to rectification in the presence of an auxiliary substance which is substantially insoluble in water and which forms with formaldehyde and water, but not with the acid present, a ternary mixture having a boiling point lower than that of the acid present, the water content of the mixture undergoing rectification being adjusted to the extent necessary to bring about the formation of said ternary mixture, and separately recovering the substantially anhydrous acid substances from the lower portion of the rectification zone and a substantially acid-free aqueous solution of the formaldehyde, from the product removed from an upper portion of the rectification zone.

2. A process for the separation of the acid substances, formaldehyde and ketone from a mixture of at least one lower aliphatic monocarboxylic acid, water, formaldehyde and a ketone of boiling point lower than the said acid present, which comprises subjecting the said mixture to rectification in the presence of an auxiliary substance which is substantially insoluble in water and which forms with formaldehyde and water, but not with the acid present, a ternary mixture having a boiling point lower than that of the acid present, the water content of the mixture undergoing rectification being adjusted to the extent necessary to bring about the formation of said ternary mixture, the auxiliary substance being one which is incapable for forming a binary azeotrope with the said ketone or a ternary azeotrope with the said ketone and water, the azeotropic mixture which it does form having a boiling point greater than that of the ketone but lower than that of the lowest boiling acid present in the mixture, and separately recovering the substantially anhydrous acid substances from the lower portion of the rectification zone, the ketone substantially free from formaldehyde from the upper portion of the rectification zone, and a substantially acid-free aqueous solution of the formaldehyde from a mid-portion of the rectification zone.

References Cited in the file of this patent

UNITED STATES PATENTS

| | | |
|---|---|---|
| 1,839,894 | Richard | Jan. 5, 1932 |
| 1,839,932 | Richard | Jan. 5, 1932 |
| 2,412,215 | Guinot | Dec. 10, 1946 |
| 2,690,992 | McCants | Oct. 5, 1954 |

FOREIGN PATENTS

| | | |
|---|---|---|
| 1,074,028 | France | Mar. 31, 1954 |